(12) United States Patent  
Peterson et al.

(10) Patent No.: US 7,997,211 B2  
(45) Date of Patent: Aug. 16, 2011

(54) WALL MOUNTED WORKSTATION

(75) Inventors: Erik R. Peterson, Spring Lake, MI (US); Dan R. Tatman, Jenison, MI (US); Matthew R. Adams, Mountain View, CA (US); Aaron A. Henningsgaard, Palo Alto, CA (US); Matthew D. Inouye, Foster City, CA (US); Jonathan I. Kaplan, Palo Alto, CA (US); Branko Lukic, Menlo Park, CA (US); Phillip N. Sharp, Mountain View, CA (US); Paul J. Silberschatz, San Francisco, CA (US); Altay J. Sendil, Pacifica, CA (US)

(73) Assignee: Steelcase Inc., Grand Rapids, MI (US)

( * ) Notice: Subject to any disclaimer, the term of this patent is extended or adjusted under 35 U.S.C. 154(b) by 1035 days.

(21) Appl. No.: 11/761,581

(22) Filed: Jun. 12, 2007

(65) Prior Publication Data

US 2007/0295870 A1   Dec. 27, 2007

Related U.S. Application Data

(60) Provisional application No. 60/812,793, filed on Jun. 12, 2006.

(51) Int. Cl.  
*A47B 23/00* (2006.01)

(52) U.S. Cl. .... 108/42; 108/50.01; 108/152; 108/50.02; 248/921; 312/223.2

(58) Field of Classification Search ............ 108/42, 108/47, 48, 50.01, 50.02, 7, 8, 9, 152, 44; 248/278.1, 917, 918, 921, 922, 923; 312/223.1, 312/223.2, 223.3, 223.6  
See application file for complete search history.

(56) References Cited

U.S. PATENT DOCUMENTS

| 25,728 A | 10/1859 | Drott |
|---|---|---|
| 539,741 A | 5/1895 | Ingram |
| 2,781,992 A | 2/1957 | Cunningham |
| 3,662,981 A | 5/1972 | Hogrebe |
| 4,114,236 A | 9/1978 | Vandervort |
| 4,122,956 A | 10/1978 | Hargrove |
| 4,313,112 A | 1/1982 | Foster |
| 4,487,389 A | 12/1984 | Ziegler |
| 4,619,727 A | 10/1986 | Hamisch, Jr. |

(Continued)

*Primary Examiner* — Jose V Chen  
(74) *Attorney, Agent, or Firm* — Price Heneveld LLP

(57) ABSTRACT

A workstation support assembly comprises a support assembly, a post assembly rotationally supported by the support assembly and including a post member, a computer monitor support assembly operably coupled for rotation with a first end of the post member, and a keyboard support assembly operably coupled for rotation with a second end of the post member, wherein rotation of the keyboard support assembly forces rotation of the post member and the monitor support assembly, and wherein rotation of the monitor support assembly does not force the rotation of the keyboard support assembly. Other aspects of the workstation comprise a four-bar linkage support arm that includes a cable management member extending therethrough for receiving and guiding wires within an interior passage of the support arm, a lockable pneumatic cylinder located within the support arm and adapted to lock the support arm at a given vertical position, a housing assembly that spans the distance between vertical studs within commercial wall structures, thereby eliminating the requirement for additional mounting structures, and a keyboard support assembly that includes a cam assembly for locking an adjustable keyboard in a storage position, and a storage compartment for slidably receiving a computer mouse therein when the keyboard support is in the storage position.

54 Claims, 13 Drawing Sheets

U.S. PATENT DOCUMENTS

| | | | |
|---|---|---|---|
| 4,635,893 A | 1/1987 | Nelson | |
| 4,638,969 A | 1/1987 | Brown | |
| 4,704,604 A | 11/1987 | Fuhs | |
| 4,726,552 A | 2/1988 | Warshawsky | |
| 4,768,744 A | 9/1988 | Leeds et al. | |
| 4,826,123 A | 5/1989 | Hannah et al. | |
| 4,836,478 A | 6/1989 | Sweere | |
| 4,844,387 A | 7/1989 | Sorgi et al. | |
| 4,852,500 A | 8/1989 | Ryburg et al. | |
| 4,852,842 A | 8/1989 | O'Neill | |
| 4,863,124 A | 9/1989 | Ball et al. | |
| 5,108,063 A | 4/1992 | Koerber, Sr. et al. | |
| 5,123,621 A | 6/1992 | Gates | |
| 5,330,137 A | 7/1994 | Oliva | |
| 5,342,137 A | 8/1994 | Peng | |
| 5,358,208 A | 10/1994 | Moseley, III et al. | |
| 5,366,127 A | 11/1994 | Heinz | |
| 5,374,104 A | 12/1994 | Moore et al. | |
| 5,482,232 A | 1/1996 | Wynn et al. | |
| 5,537,289 A | 7/1996 | Dahl | |
| D375,726 S | 11/1996 | Witte | |
| 5,630,566 A | 5/1997 | Case | |
| 5,683,064 A | 11/1997 | Copeland et al. | |
| D391,243 S | 2/1998 | Rosen | |
| D391,262 S | 2/1998 | Rosen | |
| D391,946 S | 3/1998 | Rosen | |
| 5,738,316 A | 4/1998 | Sweere et al. | |
| 5,743,503 A | 4/1998 | Voeller et al. | |
| D395,874 S | 7/1998 | Rosen | |
| D395,896 S | 7/1998 | Rosen | |
| D396,042 S | 7/1998 | Rosen | |
| 5,775,655 A * | 7/1998 | Schmeets | 108/42 |
| 5,823,120 A | 10/1998 | Holmquist | |
| 5,842,672 A | 12/1998 | Sweere et al. | |
| 5,918,841 A | 7/1999 | Sweere et al. | |
| 5,931,102 A * | 8/1999 | Grahl | 108/42 |
| 5,941,488 A | 8/1999 | Rosen | |
| 5,967,479 A | 10/1999 | Sweere et al. | |
| 5,992,809 A | 11/1999 | Sweere et al. | |
| 5,996,954 A | 12/1999 | Rosen et al. | |
| 6,007,036 A | 12/1999 | Rosen | |
| 6,097,590 A | 8/2000 | Genevieve et al. | |
| 6,098,936 A | 8/2000 | Birrell | |
| 6,152,411 A | 11/2000 | Lundstrom | |
| 6,179,263 B1 | 1/2001 | Rosen et al. | |
| 6,208,505 B1 | 3/2001 | Kuchta et al. | |
| 6,246,573 B1 | 6/2001 | Khan et al. | |
| 6,266,250 B1 | 7/2001 | Foye | |
| 6,298,794 B1 | 10/2001 | Brown et al. | |
| 6,402,644 B2 | 6/2002 | Stanford et al. | |
| 6,409,134 B1 | 6/2002 | Oddsen, Jr. | |
| 6,493,220 B1 | 12/2002 | Clark et al. | |
| 6,554,238 B1 | 4/2003 | Hibberd | |
| 6,560,094 B2 | 5/2003 | Schmidt | |
| 6,601,815 B2 | 8/2003 | Thompson | |
| 6,609,691 B2 | 8/2003 | Oddsen, Jr. | |
| 6,619,606 B2 | 9/2003 | Oddsen, Jr. et al. | |
| 6,628,510 B2 | 9/2003 | Genin | |
| 6,644,748 B2 | 11/2003 | Tholkes et al. | |
| 6,691,626 B2 | 2/2004 | Warner | |
| 6,695,270 B1 | 2/2004 | Smed | |
| 6,702,372 B2 | 3/2004 | Tholkes et al. | |
| 6,712,008 B1 * | 3/2004 | Habenicht et al. | 108/50.01 |
| 6,719,253 B2 | 4/2004 | Oddsen, Jr. | |
| 6,721,178 B1 | 4/2004 | Clark et al. | |
| 6,726,167 B2 | 4/2004 | Oddsen, Jr. | |
| 6,732,988 B2 | 5/2004 | Ihalainen et al. | |
| 6,736,360 B1 | 5/2004 | Buczek | |
| 6,736,364 B2 | 5/2004 | Oddsen, Jr. | |
| 6,783,105 B2 | 8/2004 | Oddsen, Jr. | |
| 6,799,816 B2 | 10/2004 | Touzani | |
| 6,915,994 B2 | 7/2005 | Oddsen, Jr. | |
| 6,964,399 B1 | 11/2005 | O'Neill | |
| 6,983,917 B2 | 1/2006 | Oddsen, Jr. | |
| 7,009,840 B2 | 3/2006 | Clarke et al. | |
| 7,677,515 B2 * | 3/2010 | Oddsen et al. | 248/274.1 |
| 2001/0013304 A1 | 8/2001 | Davis et al. | |
| 2001/0024984 A1 | 9/2001 | Stanford et al. | |
| 2002/0079415 A1 | 6/2002 | Oddsen, Jr. | |
| 2002/0121755 A1 | 9/2002 | Workman et al. | |
| 2002/0126110 A1 | 9/2002 | Bowron | |
| 2003/0001057 A1 | 1/2003 | Sweere et al. | |
| 2003/0039094 A1 | 2/2003 | Sarkinen et al. | |
| 2003/0042109 A1 | 3/2003 | Bacon | |
| 2003/0080269 A1 | 5/2003 | Oddsen, Jr. | |
| 2003/0201372 A1 | 10/2003 | Dozier | |
| 2003/0234328 A1 | 12/2003 | Oddsen, Jr. | |
| 2004/0025754 A1 | 2/2004 | Dye | |
| 2004/0056155 A1 | 3/2004 | Chen et al. | |
| 2004/0094072 A1 | 5/2004 | Fabian | |
| 2004/0144900 A1 | 7/2004 | Sheppard | |
| 2004/0163574 A1 * | 8/2004 | Schoenbach et al. | 108/50.01 |
| 2004/0165348 A1 | 8/2004 | Clark et al. | |
| 2004/0178312 A1 | 9/2004 | Parsons | |
| 2004/0216646 A1 | 11/2004 | Dye | |
| 2004/0222344 A1 | 11/2004 | Oddsen, Jr. | |
| 2004/0251390 A1 | 12/2004 | Wachob | |
| 2004/0254020 A1 | 12/2004 | Dragusin | |
| 2005/0022699 A1 * | 2/2005 | Goza | 108/50.01 |
| 2005/0036277 A1 | 2/2005 | Kessler et al. | |
| 2005/0045788 A1 | 3/2005 | Mongeau | |
| 2005/0152102 A1 | 7/2005 | Shin | |
| 2006/0022096 A1 | 2/2006 | Chan et al. | |
| 2006/0049327 A1 | 3/2006 | Chen | |
| 2006/0050471 A1 | 3/2006 | Chen | |
| 2006/0050472 A1 | 3/2006 | Chen | |
| 2008/0006183 A1 * | 1/2008 | Patrick et al. | 108/42 |

* cited by examiner

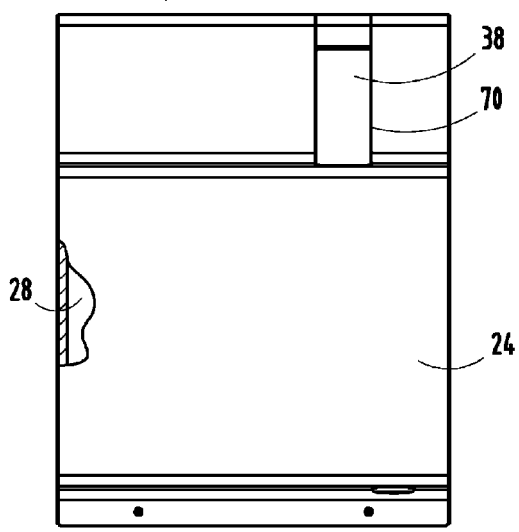
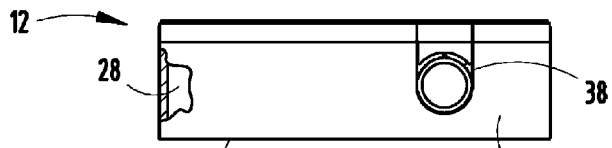
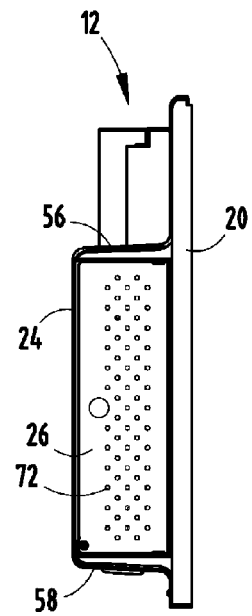
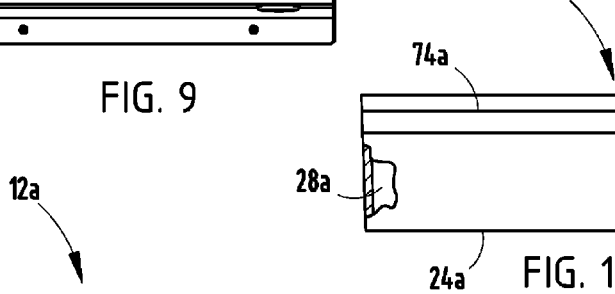
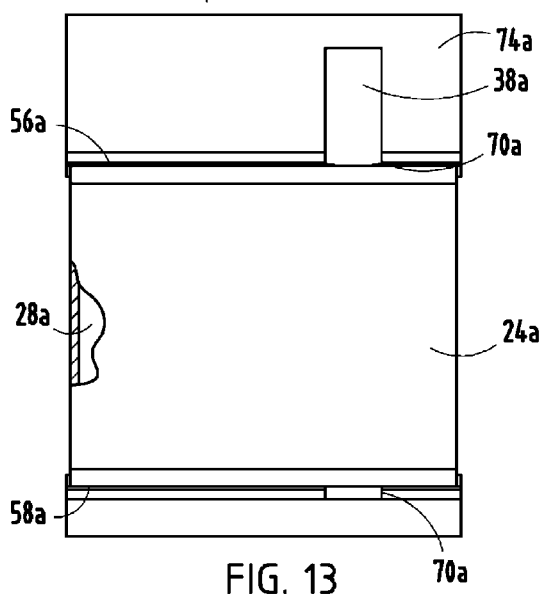
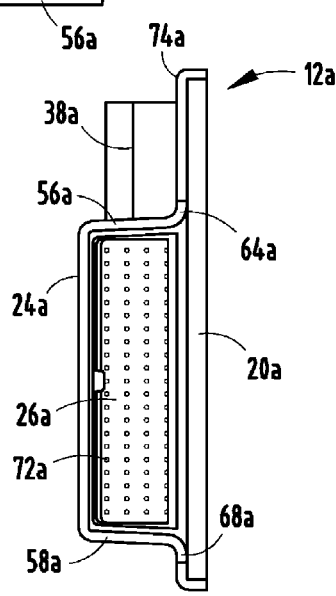

WALL MOUNTED WORKSTATION

CROSS-REFERENCE TO RELATED APPLICATION

This application claims the benefit of U.S. Provisional Application No. 60/812,793, filed Jun. 12, 2006, entitled WALL MOUNTED WORKSTATION, which is hereby incorporated herein by reference in its entirety.

BACKGROUND OF THE INVENTION

The present invention relates to a workstation assembly, and in particular to a wall-mounted workstation assembly that operably supports a computer monitor and a computer keyboard and that provides both coupled and individual manipulation and maneuvering thereof.

Workstation assemblies adapted to support computer monitors and/or computer keyboards encompass a wide variety of designs that are adapted to be used in various work settings. Many of these designs are specifically adapted to be used within a particular work environment. One such work environment is that dictated by the medical field. Specifically, numerous advancements in electronic patient information allow medical practitioners easy and updated access to complete medical records and the latest patient information. While information can be accessed through conventional desktop and lap top computers located within a medical facility, patient care is optimized by providing such access to these medical practitioners within the patient care rooms themselves, rather than requiring the care giver to retreat to an office setting to gather such information. Approaches to providing such interface within patient rooms has included mobile carts, as well as wall mounted units. However, as floor space within most medical facilities is at a premium, large mobile units typically go unused due to the lack of space and their cumbersome design. Further, previous wall-mounted units are also typically large in design and cumbersome to use. Moreover, these units do not provide adequate maneuverability or adjustability to the caregiver to allow easy access to the information, and/or to allow the caregiver to easily share information and images with other physicians attending to the patient, or with the patient themselves.

There is a need for a workstation assembly that provides adequate maneuverability and adjustability so as to facilitate easy access and interaction with the computer equipment being supported, and sharing among numerous individuals, while simultaneously reducing the overall amount of required floor space or general space within the room.

SUMMARY OF THE INVENTION

One aspect of the present invention is to provide a workstation support assembly comprising a support assembly, and a post assembly rotationally supported by the support assembly and including a post member having a first end and a second end. The workstation support assembly also comprises a computer monitor support assembly adapted to support a computer monitor and operably coupled for rotation with the first end of the post member, and a keyboard support assembly adapted to support a computer keyboard and operably coupled for rotation with the second end of the post member, wherein rotation of the keyboard support assembly forces rotation of the computer monitor assembly, and wherein rotation of the computer monitor support assembly does not force a rotation of the computer keyboard assembly.

The present invention also relates to a workstation support assembly adapted to support computer monitor comprising a first elongate member, a second elongate member, and a first end member pivotally coupled to the first and second elongate members and pivotally supportable from a support assembly. The workstation support assembly also comprises a second end member pivotally coupled to the first end second elongate members, wherein the first elongate member, the second elongate member, and wherein the first end member and the second end member cooperate to form a four-bar linkage and an interior passage. The workstation support assembly further comprises a cable management member extending through the interior passage and forming a trough to receive and guide wires within the interior passage.

The present invention further relates to a workstation assembly comprising a housing assembly including a rear wall having a width adapted to span a distance between vertical studs within a mounting wall, and a cover member that cooperates with the rear wall to form an interior space adapted to house a computer CPU therein. The workstation assembly also comprises a support assembly operably coupled to the housing assembly, and a computer monitor support assembly operably coupled to the support of the computer monitor therefrom.

The present invention further relates to a keyboard support assembly comprising a support member, and a keyboard support tray operably coupled to the support member and moveable between a lowered in-use position and a raised storage position with respect to the support member. The keyboard support assembly also comprises a cam assembly including a cam member connected to a select one of the support member and the keyboard support tray, and an engagement member connected to a select one of the support member and the keyboard support tray not connected to the cam member, wherein the engagement member engages the cam member to selectively hold the keyboard support tray in the raised storage position.

The present invention still further relates to a keyboard support assembly comprising a support member, and a keyboard support tray operably coupled to the support member and moveable between a lowered in-use position and a raised storage position with respect to the support member, wherein the keyboard support tray includes a keyboard support surface and a storage compartment, the keyboard support surface configured for manipulation of a computer input device thereon, and wherein the storage compartment is adapted to receive a computer input device when the keyboard support tray is in the storage position.

The present invention still further relates to a workstation support assembly adapted to support a computer monitor comprising a computer monitor support member, a first elongate member, a second elongate member, and a first end member pivotally coupled to the first and second elongate members and pivotally supportable from a support assembly. The workstation support assembly also includes a second end member pivotally coupled to the first and second elongate members, wherein the first elongate member, the second elongate member, the first end member and the second end member cooperate to form a four-bar linkage and an interior passage, and wherein the second member is operably coupled to the computer monitor support member. The workstation support assembly further comprises a pneumatic cylinder having a first end pivotally coupled to the first end member and a second end pivotally coupled to the second end member, wherein the pneumatic cylinder has a valve for actuating the pneumatic cylinder, and an actuator remotely located from the pneumatic cylinder and operably coupled with the valve for actuating the valve, and wherein the pneumatic cylinder is locked at a given length unless the actuator has actuated the valve of the pneumatic cylinder.

The present inventive workstation support assembly provides improved maneuverability and adjustability that facilitates easy access and interaction with the associated computer equipment. The workstation support assembly also improves the ability to share information amongst healthcare professionals attending to a particular patient, as well as the patient themselves. The workstation support assembly further reduces the amount of floor space necessary for use, and is compact when in storage. Moreover, the present invention is uncomplicated in design, can be operated by even unskilled personnel, can be easily and quickly assembled, is efficient in use, and is particularly well adapted for the proposed use.

These and other advantages of the invention will be further understood and appreciated by those skilled in the art by reference to the following written specification, claims and appended drawings.

BRIEF DESCRIPTION OF THE DRAWINGS

FIG. 8 is a top plan view of the wall mount assembly;

FIG. 9 is a front elevational view of the wall mount assembly;

FIG. 10 is a side elevational view of the wall mount assembly;

FIG. 12 is a top plan view of the alternative embodiment of the wall mount assembly;

FIG. 13 is a front view of the alternative embodiment of the wall mount assembly;

FIG. 14 is a side view of the alternative embodiment of the wall mount assembly;

DETAILED DESCRIPTION OF THE PREFERRED EMBODIMENTS

Figure 1:
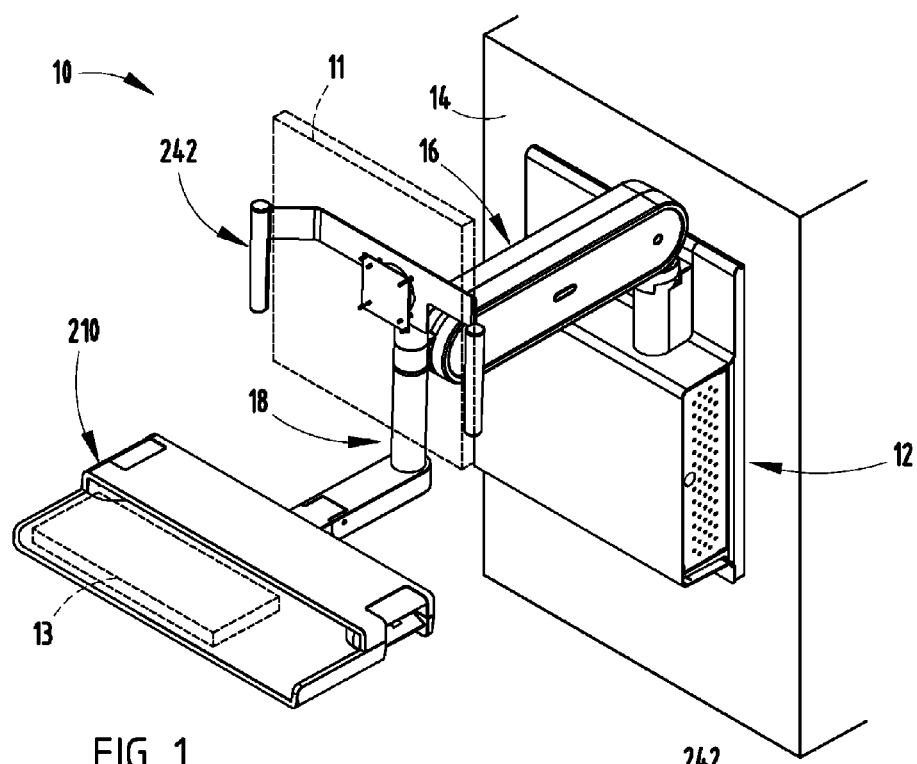
FIG. 1 is a top perspective view of a workstation assembly embodying the present invention and supporting a computer monitor and a computer keyboard.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
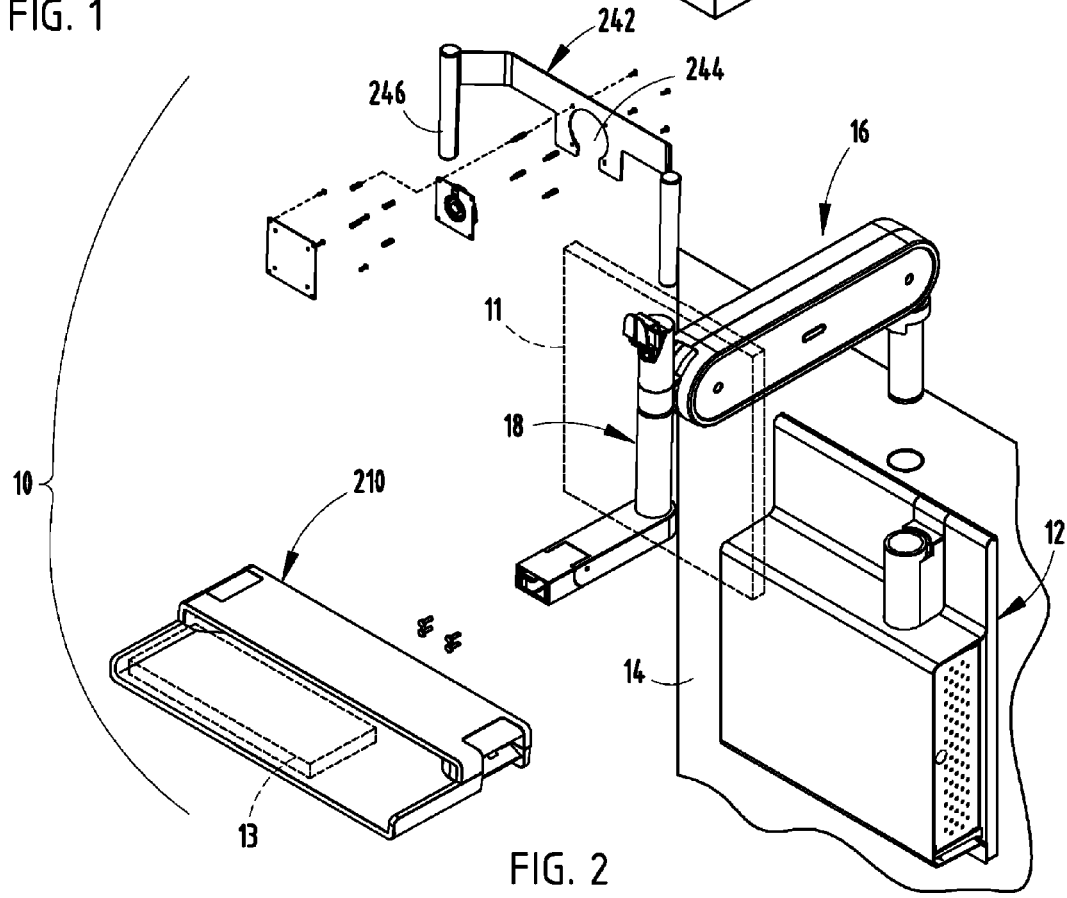
FIG. 2 is an exploded top perspective view of the workstation assembly.
Figure 3:
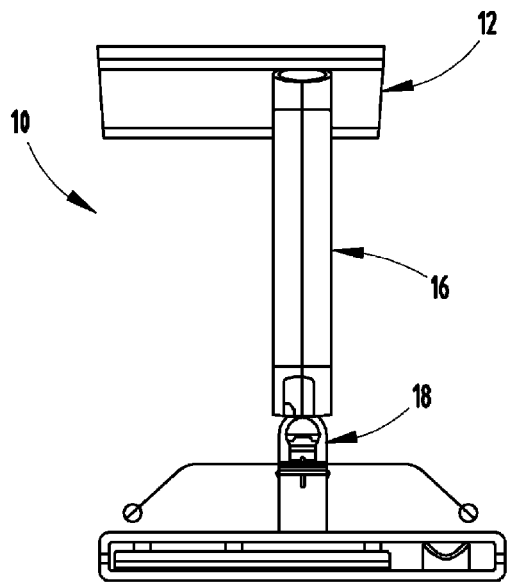
FIG. 3 is a top plan view of the workstation assembly extending away from a wall, and with a keyboard support tray in a raised, storage position.
Figure 4:
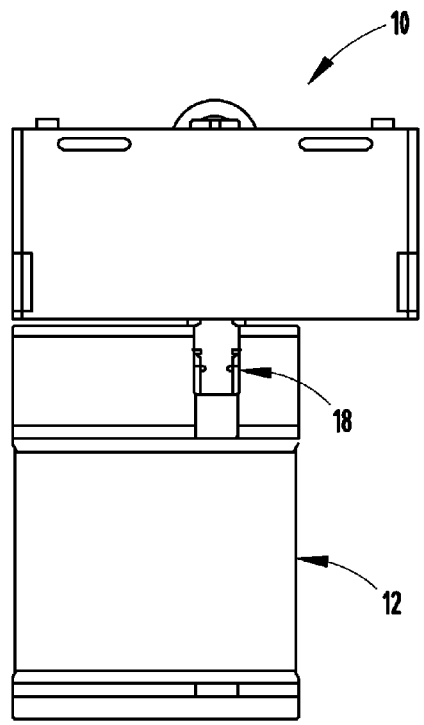
FIG. 4 is a front elevational view of the workstation assembly extending away from the wall, and with the keyboard support tray in the raised, storage position.
Figure 5A:
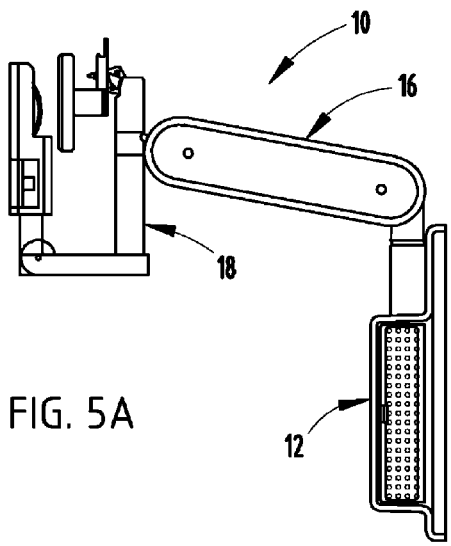
FIG. 5A is a side elevational view of the workstation assembly extending away from the wall, and with the keyboard support tray in the raised position.
Figure 5B:
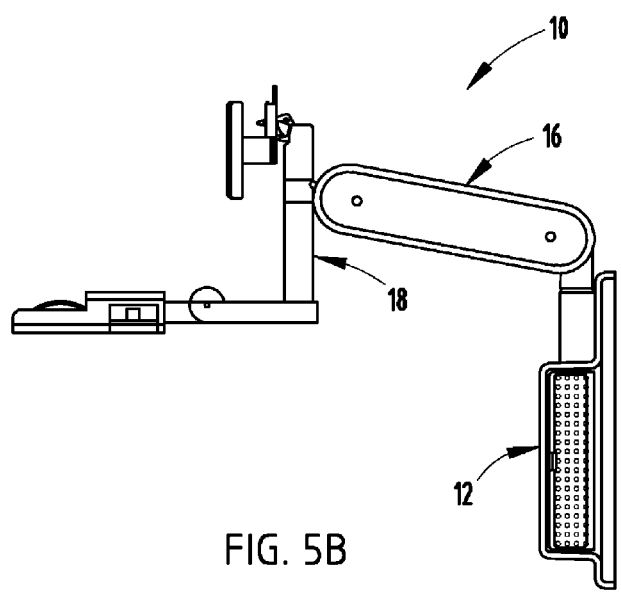
FIG. 5B is a side elevational view of the workstation assembly extending away from the wall, and with the keyboard support tray in a lowered, in-use position.
Figure 6A:
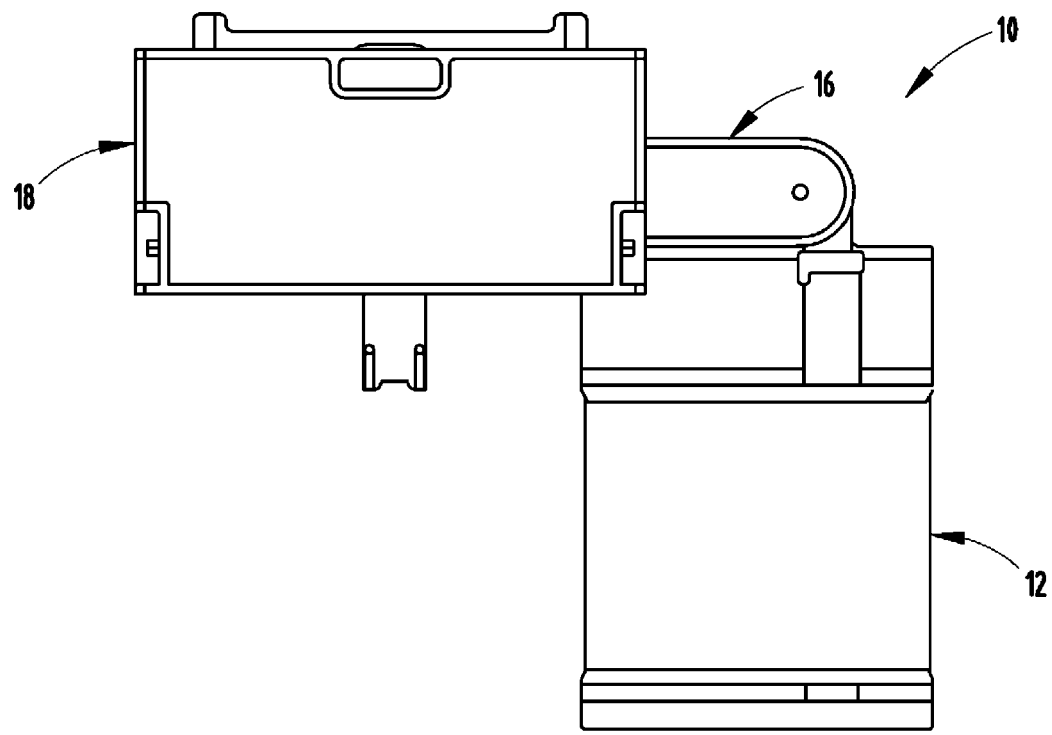
FIG. 6A is a front elevational view of the workstation assembly folded into a storage position.
Figure 6B:
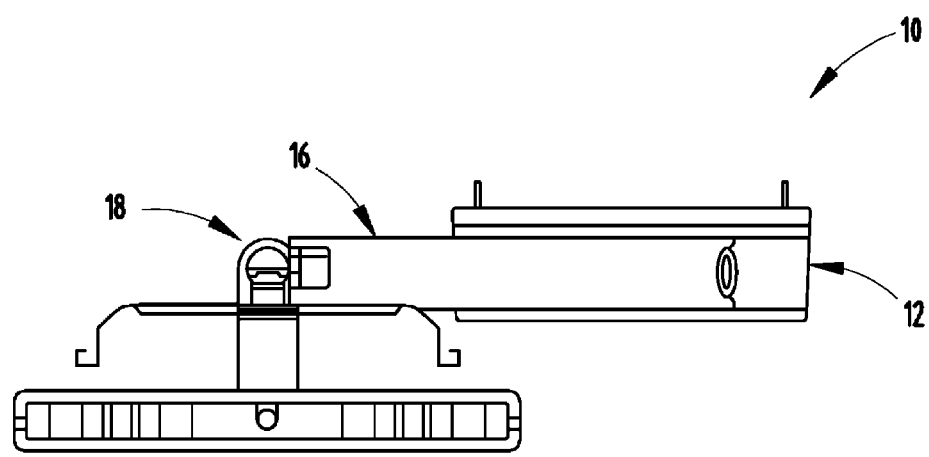
FIG. 6B is a top plan view of the workstation assembly folded into the storage position.
Figure 7:
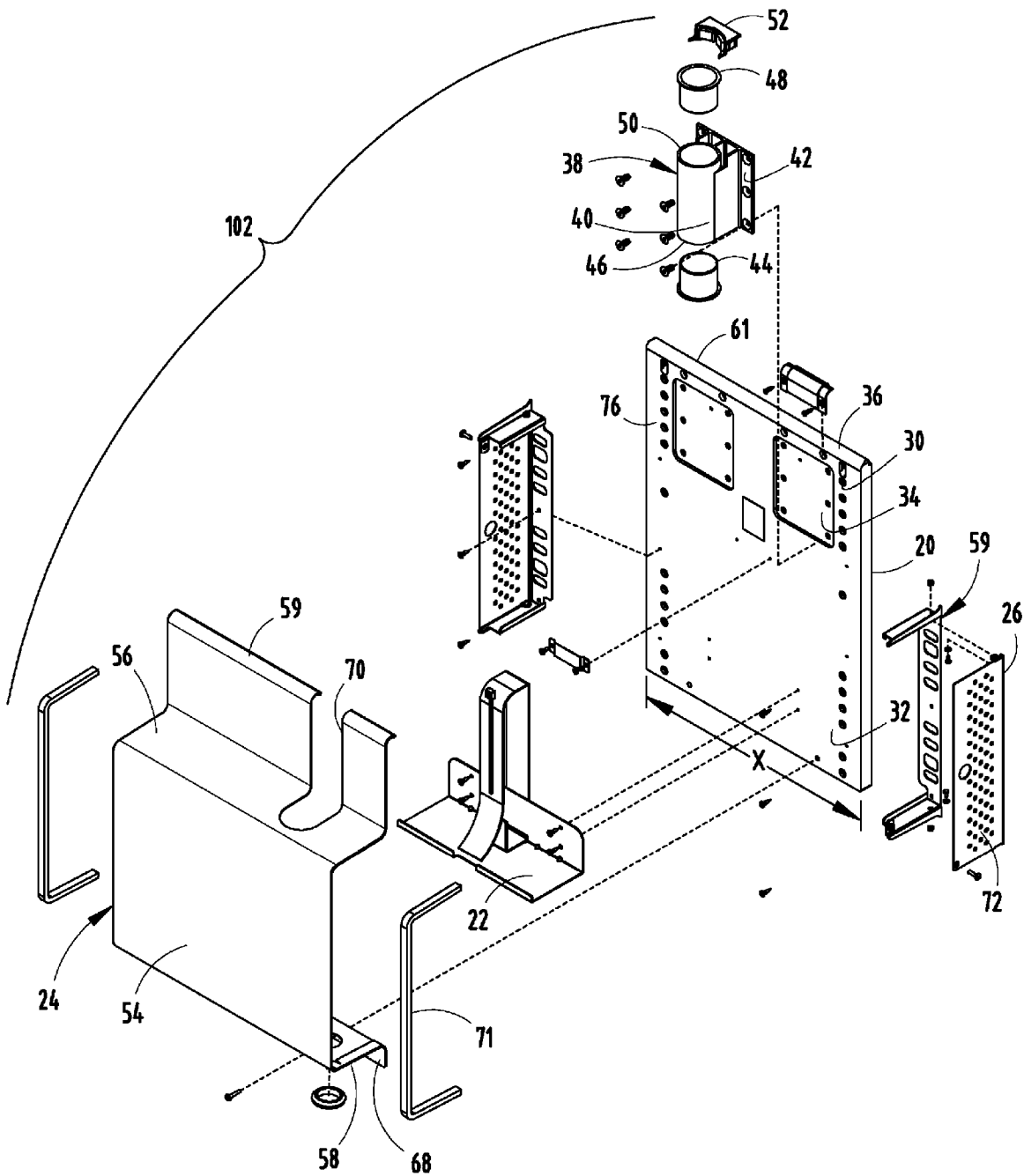
FIG. 7 is an exploded top perspective view of a wall mount assembly.

The reference numeral 10 (FIGS. 1 and 2) generally designates a workstation assembly embodying the present invention, that is adapted for use within medical facilities, and particularly for use within patient rooms. The workstation assembly 10 is adapted to support a computer monitor 11 and a computer keyboard 13, and comprises a wall mount assembly 12 secured to a permanent or partition wall 14, a vertically-adjustable support arm assembly 16 pivotally coupled to the wall mount assembly 12, and a pivot assembly 18 pivotally supported by the support arm assembly 16. As is best illustrated in FIGS. 3-5B, the workstation assembly 10 is highly adjustable between an extended position, wherein the support arm assembly 16 and the pivot assembly 18 extend outwardly away from the wall 14, and a storage position (FIGS. 6A and 6B), wherein the support arm assembly 16 and the pivot assembly 18 fold up against and are positioned proximate the wall 14 to which the wall mount assembly 12 is mounted directly to.

The wall mount assembly 12 (FIGS. 7-10) includes a rear wall 20 having a substantially planar configuration, a CPU support tray 22 adapted to support a computer CPU (not shown) thereon, a cover member 24, and a pair of end plates or end walls 26 that cooperate with the rear wall 20 and the cover member 24 to form an interior space within which the CPU is housed. The rear wall 20 comprises an MDF fiber board and is configured so as to span a distance x of at least 16 inches across the width thereof, or the standard with between wall studs in commercial facilities, thereby allowing the wall mount assembly 12 to be mounted directly to the associated wall 14 without the use of additional mounting adapters or structural supports. A plurality of mechanical fasteners 30 extend through apertures located within the rear wall 20 and mount the rear wall 20 to the wall 14. The CPU support tray 22 is secured to a forward surface 32 of the rear wall 20. The rear wall 20 further includes a pair of rectangularly-shaped recesses 34 extending into the forward surface 32 and located proximate an upper edge 36 of the rear wall 20. A tubularly-shaped pivot support 38 includes a tubular portion 40 and a rectangularly-shaped planar mounting portion 42 integrally formed with the tubular portion 40 and received within one of the two recesses 34. Specifically, the pivot support 38 may be mounted within either of the recesses 34 depending upon whether the positioning of the workstation assembly 10 within the associated room requires the workstation assembly 10 to be more preferably flush against the wall 14 when pivoted to the left (FIGS. 6A and 6B) or the right (not shown). A lower bushing 44 is positioned within a lower end 46 of the tubular portion 40, while an upper bushing 48 is positioned within an upper end 50 of the tubular portion 40. The function of the bushings 44, 48 are described below. A stop member 52 is attached to an upper end of the pivot support 38. The cover member 24 includes a front wall 54, an integrally formed top wall 56 and an integrally formed bottom wall 58. An upper edge 59 of the cover member 24 is curved and engages a curved upper edge 61 of the rear wall 20, thereby supporting the cover member 24 therefrom. The top wall 56 further includes a U-shaped notch 70 spaced along the length thereof. The end plates 26 are secured to the ends of the cover member 24 and the rear wall 20 so as to completely enclose the interior space 28. A pair of mounting brackets 59 are secured to and extend outwardly from the forward surface 32 of the rear wall 20 and are utilized to support the end plates 26. A pair of trim strips 71 are used to trim the end plates 26 with the cover member 24. Each of the end plates 26 includes a plurality of perforations 72 extending therethrough that allow airflow through the interior space 28 and cool the CPU supported therein.

Alternatively, the wall mount assembly 12A (FIGS. 11-14) includes a rear wall 20a having a substantially planar configuration, a CPU support tray 22a adapted to support a computer CPU (not shown) thereon, a cover member 24a, and a pair of end plates or end walls 26a that cooperate with the rear wall 20a and the cover member 24a to form an interior space within which the CPU is housed. As the wall mount assemblies 12a and 12 are similar in construction, the same corresponding reference numerals have been used for both except for the suffix "a" in the reference numerals of the latter. The rear wall 20a comprises an MDF fiber board and is configured so as to span a distance x of at least 16 inches across the width thereof, or the standard with between wall studs in commercial facilities, thereby allowing the wall mount assembly 12a to be mounted directly to the associated wall 14a without the use of additional mounting adapters or structural supports. A plurality of mechanical fasteners 30a extend through apertures located within the rear wall 20a and mount the rear wall 20a to the wall 14a. The CPU support tray 22a is secured to a forward surface 32a of the rear wall 20a. The rear wall 20a further includes a pair of rectangularly-shaped recesses 34a extending into the forward surface 32a and located proximate an upper edge 36a of the rear wall 20a. A tubularly-shaped pivot support 38a includes a tubular portion 40a and a rectangularly-shaped planar mounting portion 42a integrally formed with the tubular portion 40a and received within one of the two recesses 34a. Specifically, the pivot support 38a may be mounted within either of the recesses 34a depending upon whether the positioning of the workstation assembly 10a within the associated room requires the workstation assembly 10a to be more preferably flush against the wall 14a when pivoted to the left (FIGS. 6A and 6B) or the right (not shown). A lower bushing 44a is positioned within a lower end 46a of the tubular portion 40a, while an upper bushing 48a is positioned within an upper end 50a of the tubular portion 40a. The function of the bushings 44a, 48a are described below. A stop member 52a is attached to an upper end of the pivot support 38a. The cover member 24a includes a front wall 54a, an integrally formed top wall 56a and an integrally formed bottom wall 58a. An upper edge 59a of the cover member 24a is curved and engages a curved upper edge 61a of the rear wall 20a, thereby supporting the cover member 24a therefrom. The top wall 56a further includes a U-shaped notch 70a spaced along the length thereof. The end plates 26a are secured to the ends of the cover member 24a and the rear wall 20a so as to completely enclose the interior space 28a. A pair of mounting brackets 59a are secured to and extend outwardly from the forward surface 32a of the rear wall 20a and are utilized to support the end plates 26a. A pair of trim strips 71a are used to trim the end plates 26a with the cover member 24a. Each of the end plates 26a includes a plurality of perforations 72a extending therethrough that allow airflow through the interior space 28a and cool the CPU supported therein.

Figure 15:
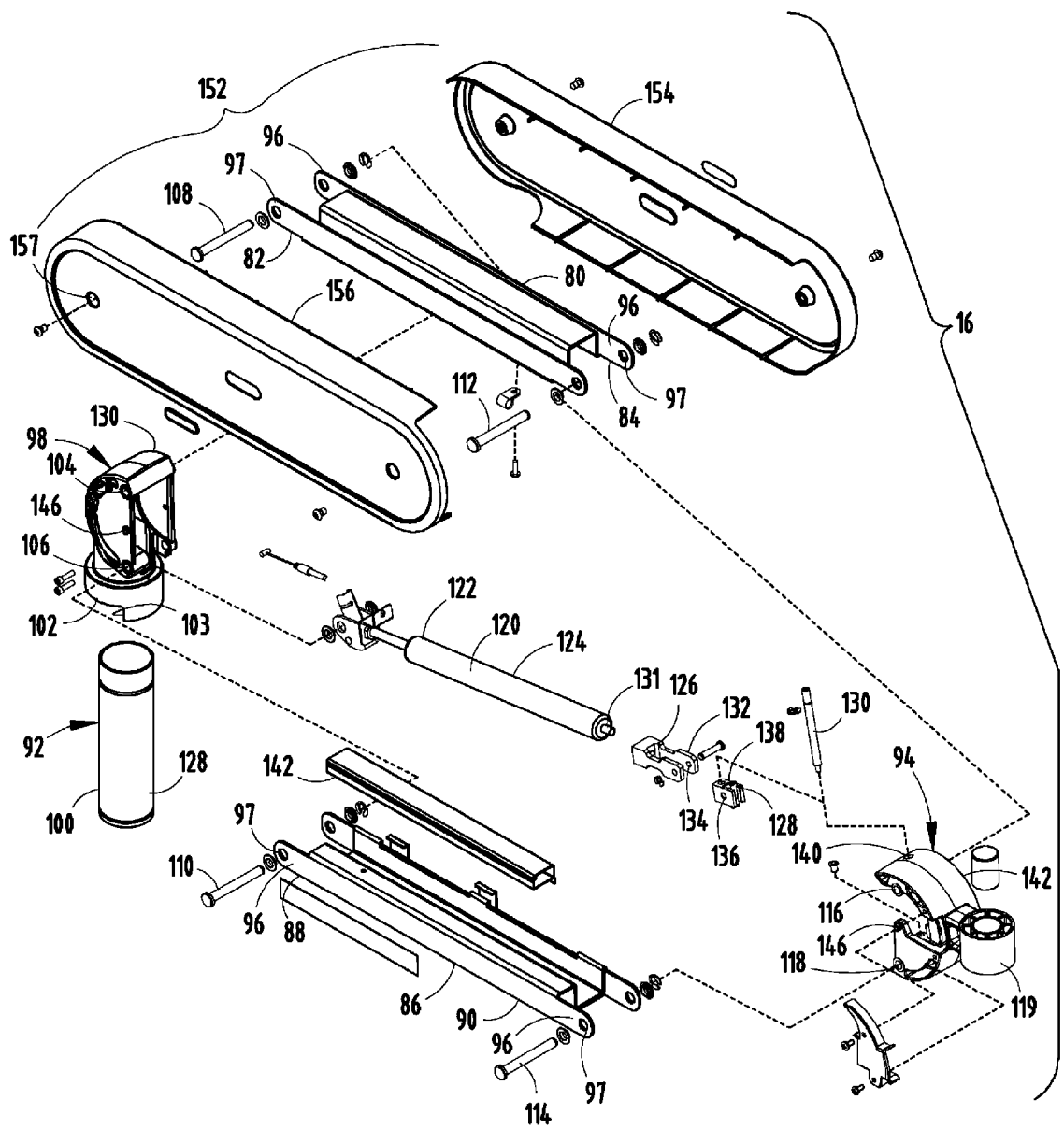
FIG. 15 is an exploded perspective view of a support arm assembly.
Figure 16:
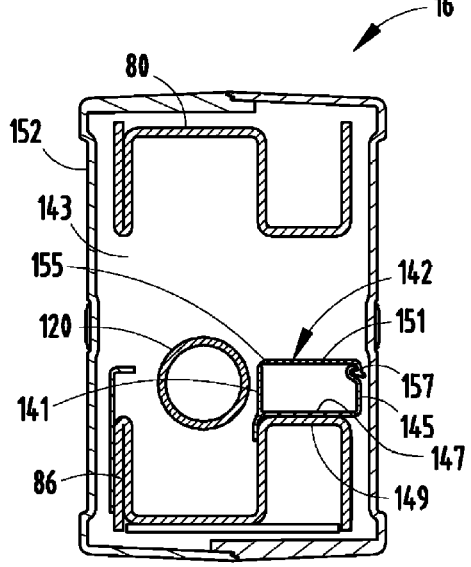
FIG. 16 is a cross-sectional end view of the support arm assembly, taken along the line XVI-XVI, FIG. 17.

The support arm assembly 16 (FIG. 15) includes an upper channel member 80 having a first end 82 and a second end 84, a lower channel member 86 having a first end 88 and a second end 90, a first end member 92 pivotally coupled to the first end 82 of the upper channel member 80 and the first end 88 of the lower channel member 86, and a second end member 94 pivotally coupled to the second end 84 of the upper channel member 80 and the second end 90 of the lower channel member 86, such that the upper channel member 80, the lower channel member 86, the first end member 92 and the second end member 94 cooperate to form a four-bar linkage assembly. The upper channel member 80 and the lower channel member 86 each comprise an S-shaped cross-sectional configuration (FIG. 16). Each of the ends 82, 84, 88, 90 each include a pair of outwardly-extending and spaced flanges 96 that receive a portion of the associated end members 92, 94 therein, as described below. Each flange 96 includes a pivot aperture 97 extending therethrough. The first end member 92 includes an arcuately-shaped body portion 98 and a cylindrical pivot leg 100 integrally formed with and extending downwardly from the body portion 98. A lip 102 having a stop 103 positioned thereabout extends about the pivot leg 100. In operation, the stop 103 of the first end member 92 cooperates with the stop member 52 of the pivot support 38 to prevent over-rotation of the arm assembly 16 with respect to the wall mount assembly 12. The body portion 98 includes an upper pivot aperture 104 and a lower pivot aperture 106. In assembly, an upper pivot pin 108 is received within the apertures 97 of the flanges 96 of the first end to the upper channel member 80 and the upper pivot aperture 104 of the first end member 92, thereby pivotally coupling the upper channel member 80 with the first end member 92, a lower pivot pin 110 similarly secures the lower channel member 86 to the first end member 92. Likewise, an upper pivot pin 112 and a lower pivot pin 114 are received within the pivot apertures 97 of the flanges 96 of the second end 84 of the upper channel member 80 and the second end 90 of the lower channel member 86, and an upper pivot aperture 116 and a lower pivot aperture 118 of the second end member 94, thereby pivotally coupling the second end member 94 with the upper channel member 80 and the lower channel member 86. The second end member 94 further includes a cylindrically-shaped pivot support 119 integrally formed therewith and extending outwardly therefrom.

The support arm assembly 16 further includes a pneumatic cylinder 120 having a first end pivotally coupled to the first end member 92 by the lower pivot pin 110, and a second end 124 pivotally coupled to the second end member 94 by a bracket member 126 fixedly coupled to the second end 124 of the pneumatic cylinder 120, a gear block 128 pivotally coupled to the bracket member 126, and an adjustment screw 130. The second end 124 includes a valve tab 131 operably coupled to an internal valve. Specifically, the bracket member 126 includes a pair of legs 132 each including an aperture 134 extending therethrough. The gear block 128 includes a horizontally-extending aperture 136, that receives a mechanical fastener therethrough along with the apertures 134 of the bracket member 126, thereby pivotally coupling the bracket member 126 with the gear block 128. The gear block 128 further includes a vertically-extending aperture 138 that receives the screw 130 therein. In assembly, the screw 130 is received within an upwardly-exposed aperture 140 of the second end member 94 and the aperture 138 of the gear block 128, thereby coupling the gear block 128 with the second end member 94.

Figure 11:
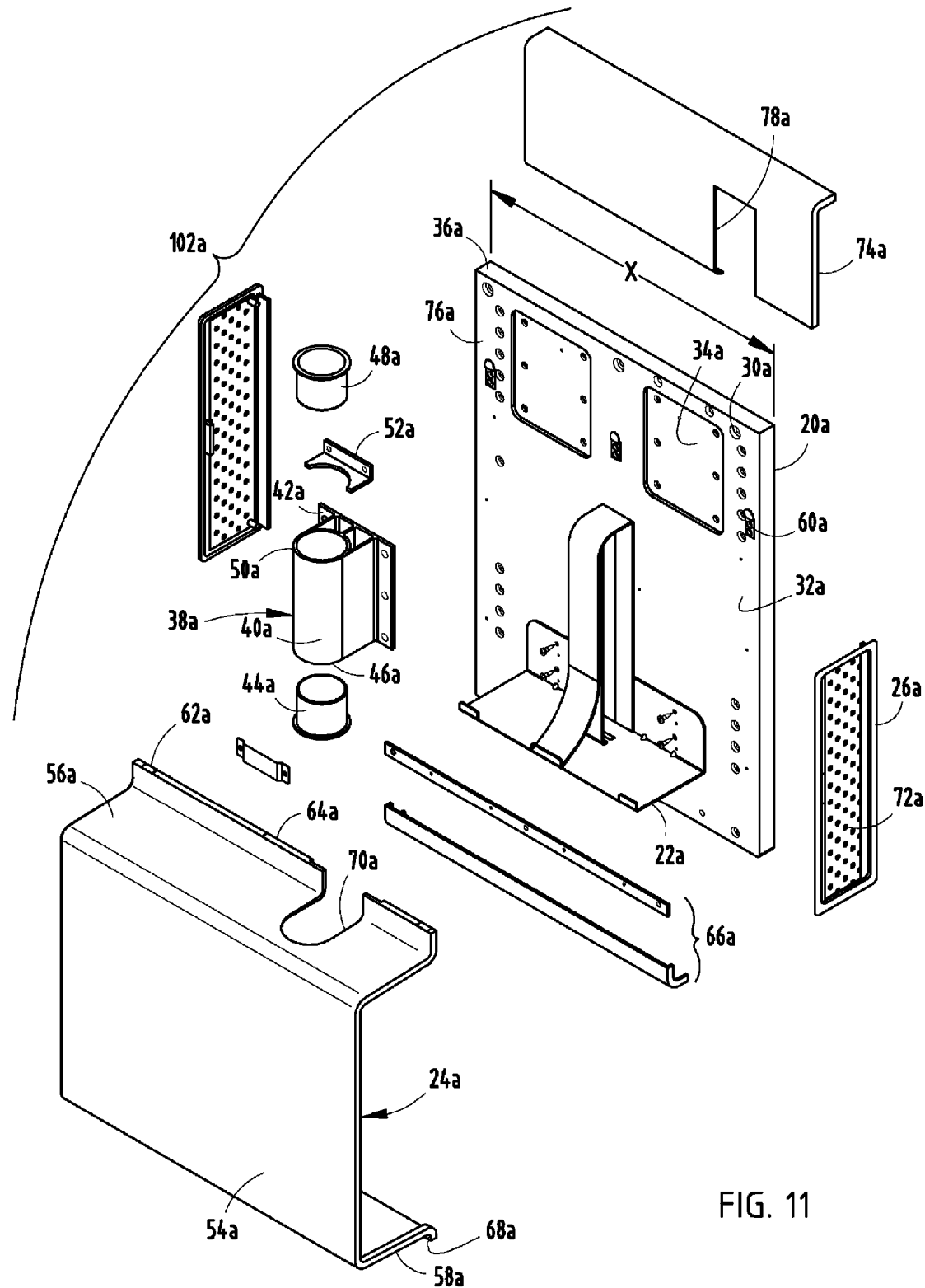
FIG. 11 is an exploded top perspective view of an alternative embodiment of the wall mount assembly.
Figure 17:
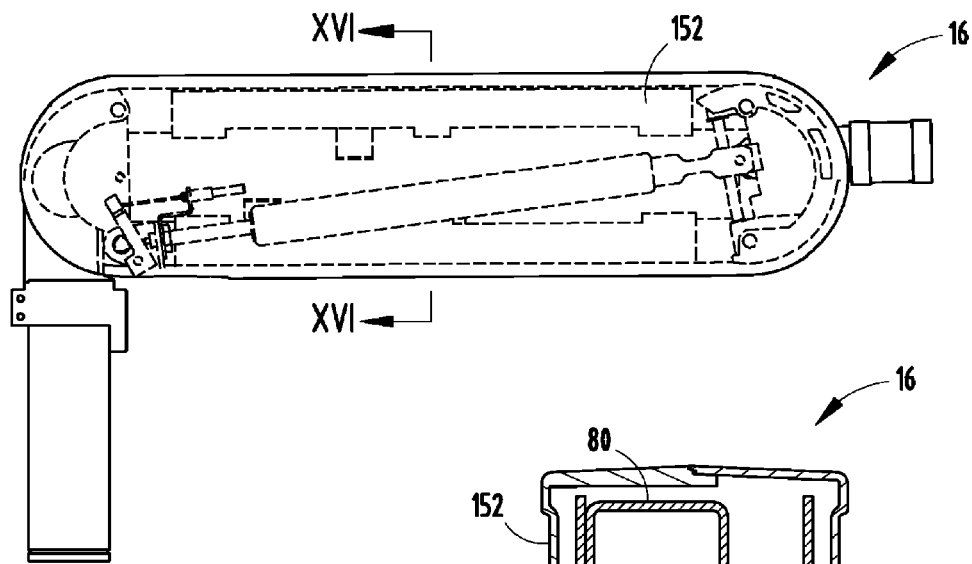
FIG. 17 is a side view of the assembled support arm assembly.

The support arm assembly 16 further includes a wire or cable manager 142 extending through an interior space 143 (FIGS. 16 and 17) of the support arm assembly 16 as defined by the upper channel member 80, the lower channel member 86, the first end member 92 and the second end member 94. As is best illustrated in FIG. 11, the wire manager 142 includes a body portion 141 having an upwardly-opening C-shaped cross-sectional configuration and including a pair of sidewalls 145 and a bottom wall 147, and a cover portion 151 coupled to the body portion 141 by a longitudinally-extending living hinge 155. In the illustrated example, the body portion 141 and the cover portion 151 are further snappably coupled with one another by a longitudinally-extending, barbed coupler 157, thereby allowing the wire manager 142 to support and house communication and electrical lines and cables associated with the computer monitor 11 and keyboard and extending through the interior space 143 of the support arm assembly 16. An adhesive secures the bottom wall 147 of the wire manager 142 to an upper wall 149 of the lower channel member 86.

The support arm assembly 16 further includes a housing 152 comprising a first shell member 154 and a second shell member 156. Each of the shell members 154, 156 includes apertures 157 extending therethrough that receive mechanical fasteners therein securing the shell members 154, 156 together and apertures 146 of each of the end members 92, 94.

In assembly, the pivot leg 100 of the second end member 94 is pivotally received within the upper bushing 48 and the lower bushing 44 of the pivot support 38 with the lip 102 of the second end member 94 abutting the upper bushing 48, such that the support arm assembly 16 fixedly supported by the wall mount assembly 12.

Figures 18A, 18B, 18C:
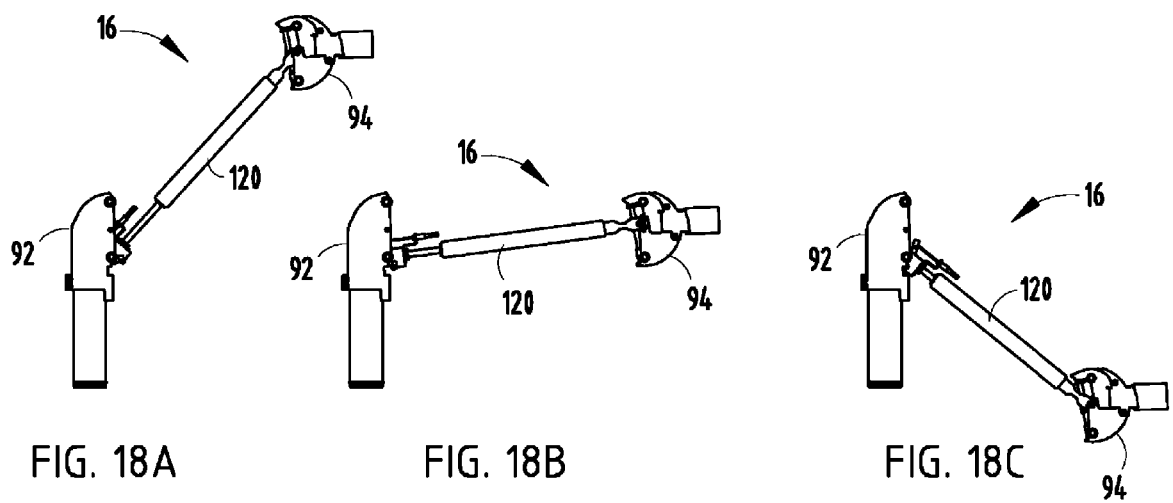
FIG. 18A is a side view of the support arm assembly in a fully raised position, and with a pair of shells removed.
FIG. 18B is a side view of the support arm assembly in an intermedial position, and with the pair of shells removed.
FIG. 18C is a side view of the support arm assembly in a fully lowered position, and with the pair of shells removed.

As best illustrated in FIGS. 18A-C, the present inventive support arm assembly 16 can be adjusted through a significant range of motion. The support arm assembly 16 of the workstation assembly 10 is configured so as to allow a full range of motion between an upper most position (FIG. 18A), wherein a standing user can make use of a supported computer monitor 11 and keyboard, an intermediate position (FIG. 18B), and a lower most position (FIG. 18C), wherein a seated user can make use of the supported components. This particular configuration allows this full range of motion without the need for additional components, such as a telescoping support post assembly, and the like.

Figure 19:
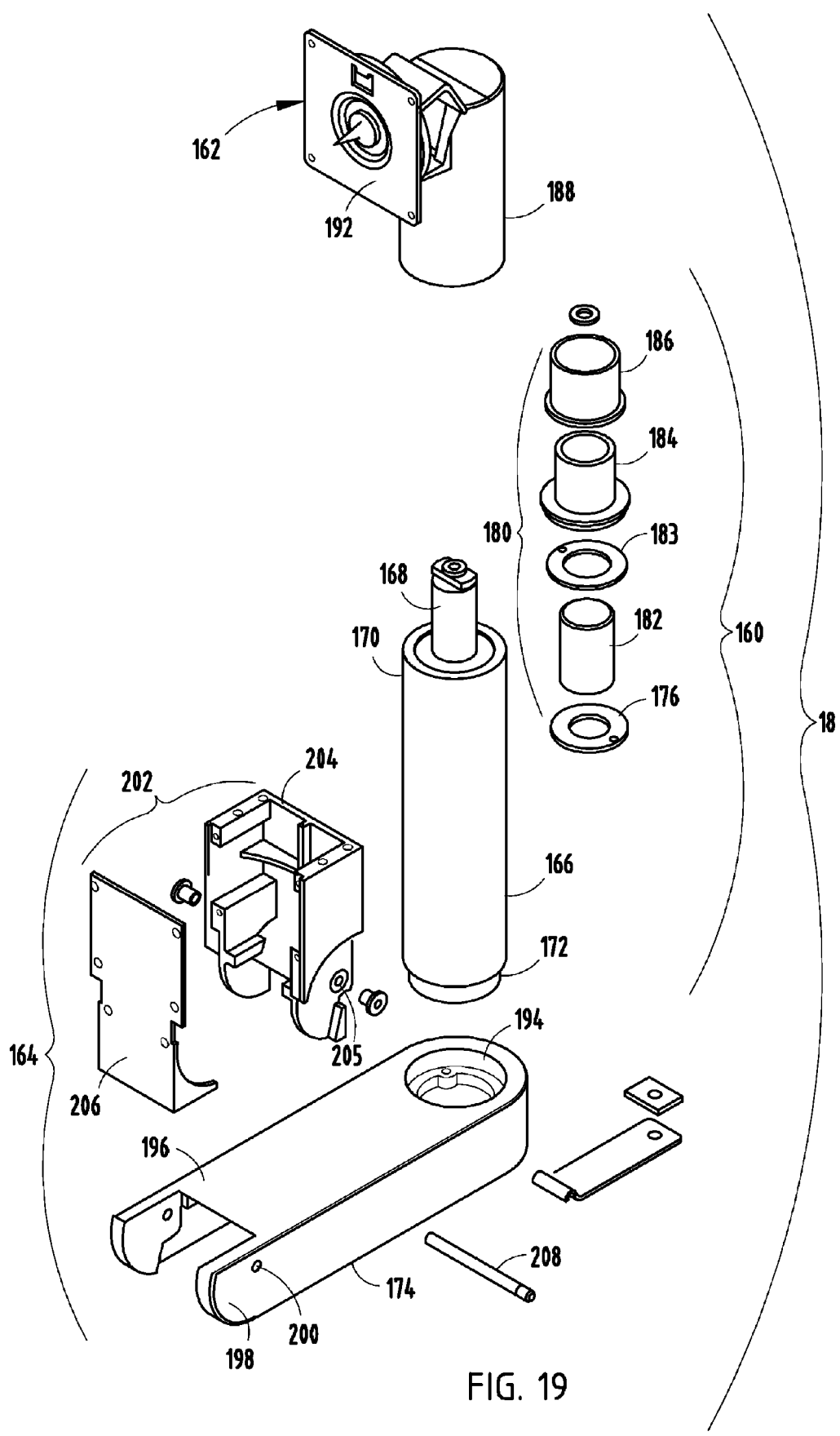
FIG. 19 is an exploded perspective view of a post assembly pivotably supporting a computer monitor support assembly and a computer keyboard support assembly.

The pivot assembly 18 (FIG. 19) is adapted to support the computer monitor 11 and computer keyboard 13 thereon. The pivot assembly 18 includes a post assembly 160, an upper portion or computer monitor 11 support assembly 162 adapted to support the computer monitor 11 thereon, and a lower portion or computer keyboard 13 support assembly 164 adapted to support the computer keyboard 13 thereon, wherein the post assembly 160 pivotally supports the monitor support assembly 162 and the keyboard support assembly 164 from the support arm assembly 16. The post assembly 160 includes a support post 166 having an upwardly-extending shaft 168 located at a first end 170 of the support post 166, and a second end 172 operably coupled to a boom arm 174 extending orthogonally outward from the support post 166. The post assembly 160 further includes a first abutment washer 176 (FIGS. 20 and 21) positioned about the shaft 168 and abutting an end of the support post 166, a bushing member 182 positioned about the shaft 168 and abutting the abutment washer 176, a second abutment washer 183 positioned about the shaft 168 and abutting the bushing member 182, a first friction collar 184 secured to an end of the shaft 168 by a screw 185 such that the frictional collar 184 abuts the second abutment washer 183, and a second friction collar 186 that frictionally engages and is supported by the first friction collar 184. In assembly, the second friction collar 186 is press fit into the inner diameter 190 of the mounting member 188. The monitor support assembly 162 comprises a tubularly-shaped mounting member 188 having an inner diameter 190, and a standard computer monitor 11 mounting bracket 192 coupled thereto. It is noted that the illustrated example includes a VESA computer monitor 11 mounting bracket, however, other configurations may be utilized.

In assembly, the bushing member 182 and the shaft 168 of the support post 166 is located within the pivot support 119 of the support arm assembly 16, such that a first frictional force is exerted between the bushing member 182 and the pivot support 119. The second friction collar 186 as press fit within the inner diameter 190 of the mounting member 188 receives the first friction collar 184 therein such that a second frictional force is exerted between an inner diameter 187 of the second friction collar 186 and the outer diameter 189 of the first friction collar 184. It is noted that the first friction is greater than the second friction, such that in operation, rotational movement of the keyboard support assembly 164, by exerting a force thereon, that pivots the support post 166 results in an equal rotation of the monitor support assembly 162. However, as the second frictional force is less than the first frictional force, a rotation of the computer monitor 11 support assembly 162 by exerting a force therein does not result in a rotation of the computer keyboard 13 support assembly 164. Such a configuration allows a person such as a healthcare provider to continue to access or input information via the supported computer keyboard 13 while allowing other persons within the vicinity, such as other positions or the patient, to observe the supported computer monitor 11.

The computer keyboard 13 support assembly 164 includes the boom arm 174 having an aperture 194 that fixedly receives the second end 172 of the support post 166 therein. A proximal end 196 of the boom arm 174 includes a pair of flanges 198 each having a pivot aperture 200 extending therethrough. A keyboard tray assembly 202 includes a pivot bracket 204 that includes a pivot aperture 205, and a housing bracket 206 that is fastened to an underside of the pivot bracket 204 to shroud the same. The pivot bracket 204 is pivotally connected to the boom arm 174 by a pivot pin 208 that extend through the pivot apertures 200 of the boom arm 174 and the pivot aperture 205 of the pivot bracket 204. The keyboard tray assembly 202 further includes a keyboard tray 210 (FIGS. 25-30) secured to and operably supported by the pivot bracket 204. The keyboard tray includes a keyboard support surface 212, an elevated worksurface 214 positioned above the keyboard support surface 212 and a plurality of walls 216 spaced along the width of the keyboard support surface 212 and located proximate a rearward edge 218 thereof.

Figure 22:
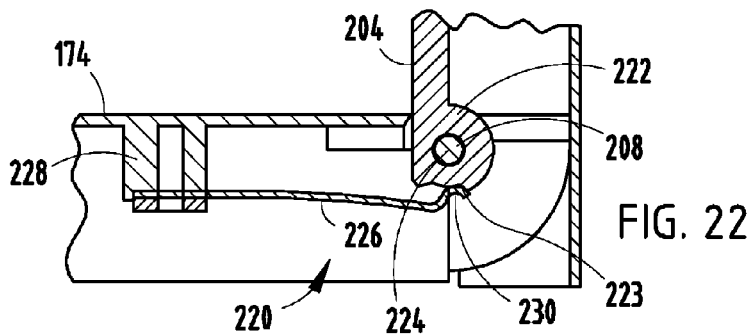
FIG. 22 is a cross-sectional view of a cam assembly, taken of the area XXII, FIG. 21, with the keyboard support tray in the raised storage position.
Figure 23:
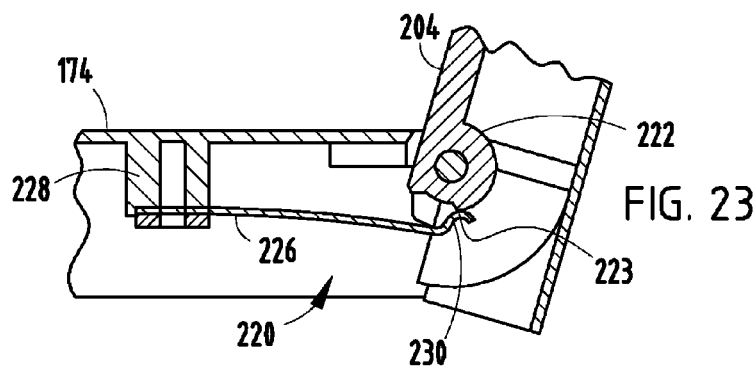
FIG. 23 is a cross-sectional view of the cam assembly, with the keyboard support tray in an intermediate position.
Figure 24:
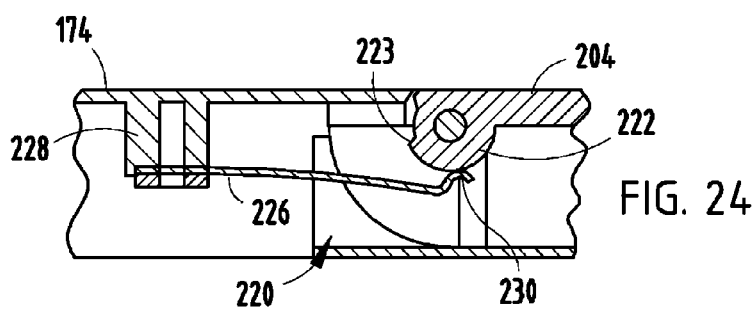
FIG. 24 is a cross-sectional view of the cam assembly, with the keyboard support tray in the lowered, in-use position.

The computer keyboard 13 support assembly 164 further includes a cam assembly 220 (FIGS. 22-24) including a cam hub 222 integrally formed with the pivot bracket 204 to pivot about an axis 224 defined by the pivot pin 208. The cam hub 222 includes a detent 223 located thereabout. The cam assembly 220 further includes a leaf spring 226 fixedly coupled to a boss 228 integrally formed with and extending downwardly from the boom arm 174. The leaf spring 226 includes a curved end portion 230. In operation, the end portion 230 of the leaf spring 226 guides along and frictionally engages the cam hub 222. In the illustrated example, the detent 223 is located along the cam hub 222 such that the leaf spring 226 engages the detent 223 to hold the pivot bracket 204 and the keyboard tray 210 in a substantially-vertically oriented storage position (FIG. 22). The keyboard tray 210 is pivotable through a range of motion including the storage position, an intermediate position, (FIG. 23), and a lowered in-use position (FIG. 24). In addition, the pivot joint about the pivot pin 28 may be configured to exact frictional engagement between the pivot bracket 204 and the boom arm 174, thereby assisting the cam assembly 220.

Figure 25:
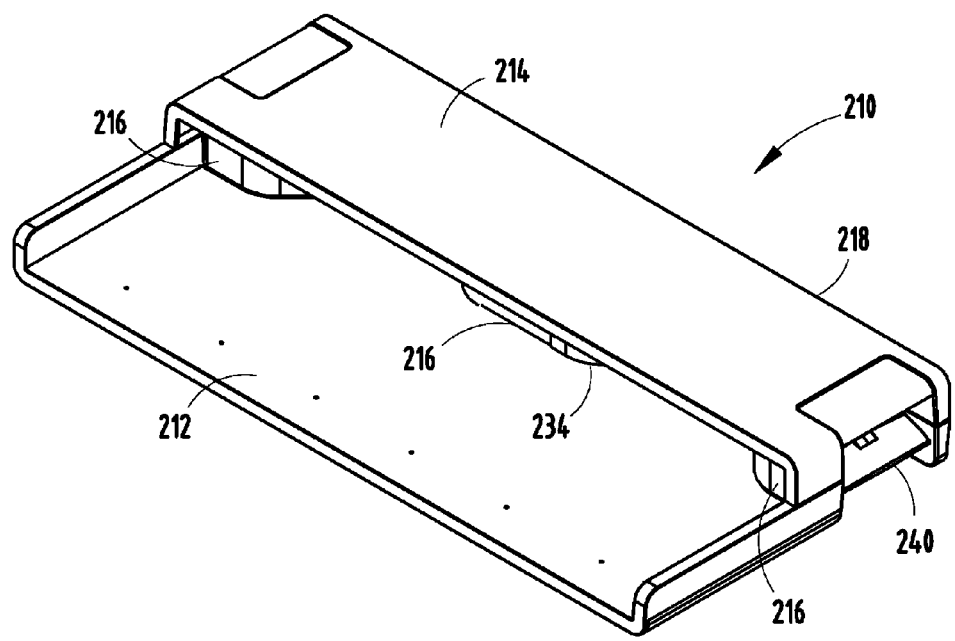
FIG. 25 is a top, front perspective view of a keyboard support tray assembly.
Figure 27:
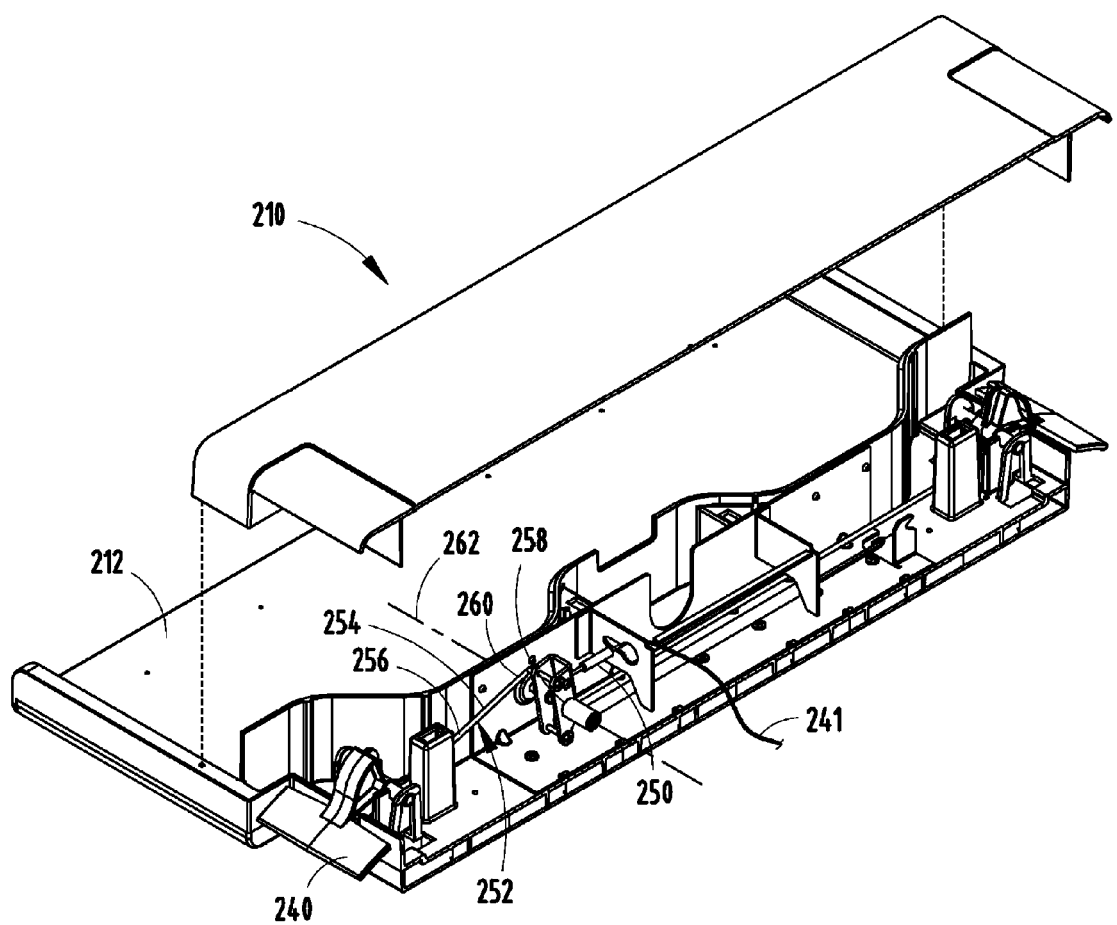
FIG. 27 is a top, rear perspective view of the keyboard support tray assembly with a work surface removed to show an interior of the keyboard support tray assembly.
Figure 26:
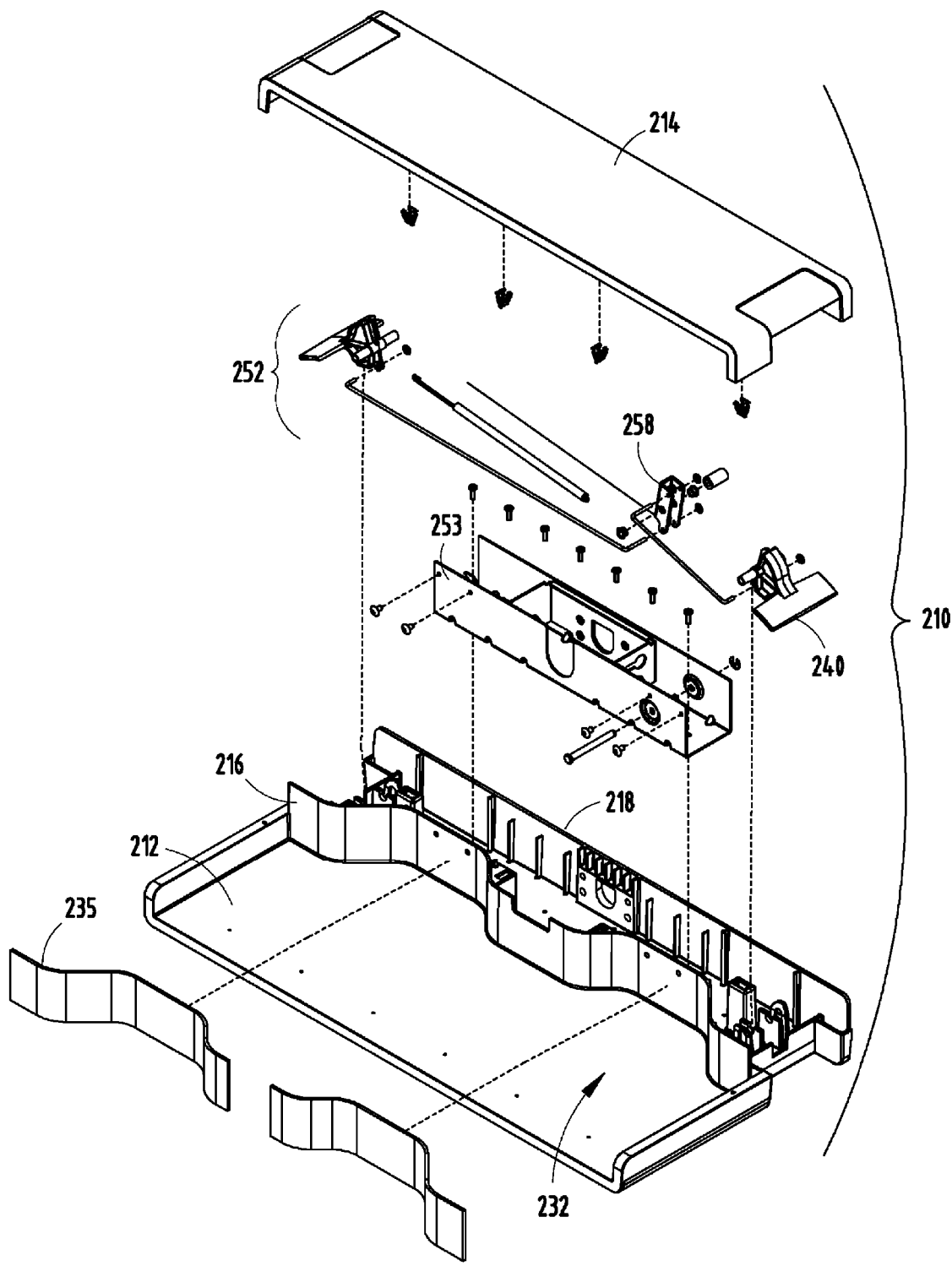
FIG. 26 is an exploded top perspective view of the keyboard support tray assembly.
Figure 28:
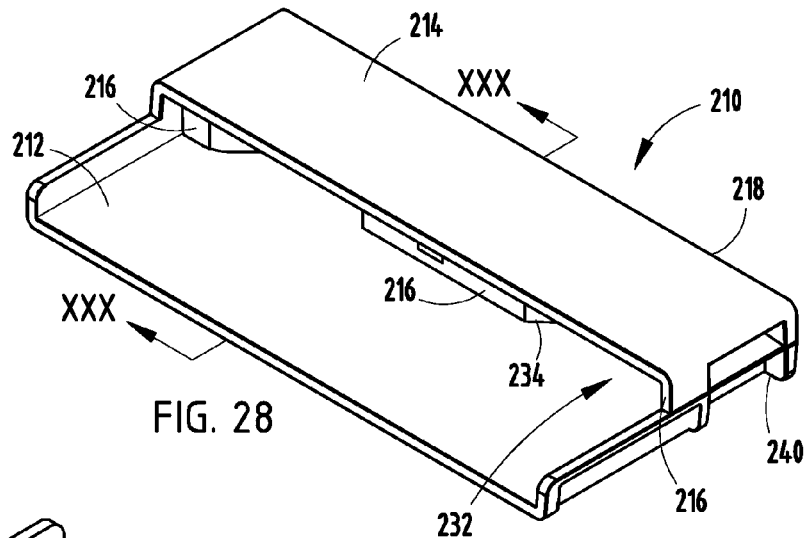
FIG. 28 is a top, front, perspective view of an alternative embodiment of the keyboard support tray assembly.
Figure 29:
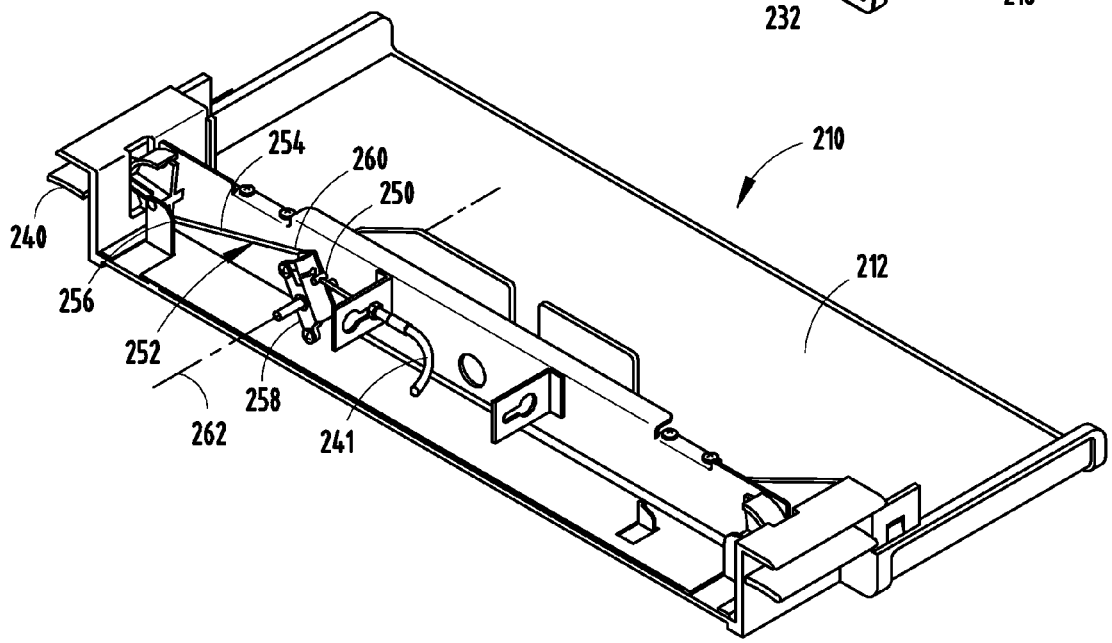
FIG. 29 is a top perspective view of the alternative embodiment of the keyboard support tray assembly with a top surface removed.
Figure 30:
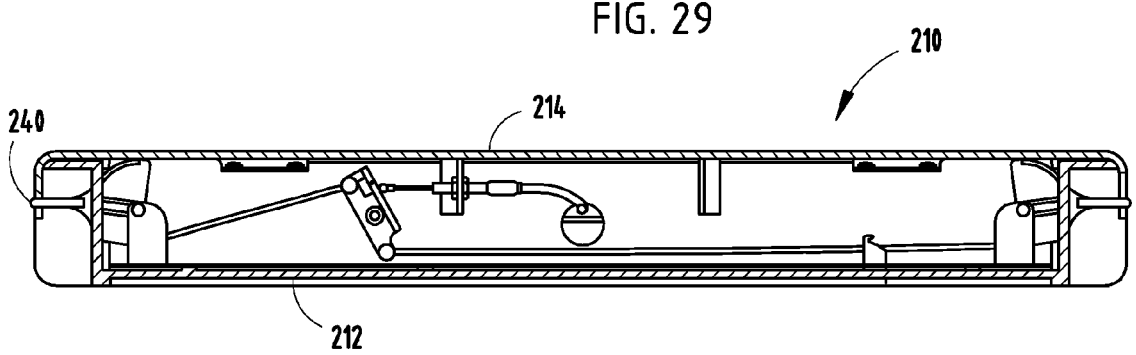
FIG. 30 is a cross-sectional side view of the keyboard support tray assembly taken along the line XXX-XXX, FIG. 28.

As is best illustrated in FIG. 25, the keyboard support surface 212, the separate worksurface 214 and the walls 216 cooperate to form a pocket or compartment 232. The keyboard support surface 212 and the worksurface 214 are each preferably comprised of molded plastic. In the illustrated example, the keyboard support surface 212 is sized so as to allow not only placement of the supporting computer keyboard 13 thereon, but also an area located forwardly of the pocket 232 that is large enough to manipulate a computer mouse thereon. The pocket 232 is sized and positioned to slidably receive the computer mouse therein when the keyboard tray 210 is moved from the in-use position to the storage position, thereby eliminating the need to remove the mouse from the keyboard support surface 212 each time the workstation assembly 10 is moved into a storage position against the wall 14. Tapered walls 234 assist in guiding the computer mouse into the pocket 232. The pockets 232 are each trimmed with a trim strip 235.

The keyboard support assembly 164 further includes an actuator handle 240 (FIGS. 25-27) pivotably coupled to the keyboard support tray 210. The handle 240 is coupled to the valve tab 131 via a bowden wire 241, thereby allowing the operator to remotely actuate the pneumatic cylinder 120 and adjust the overall height of the workstation assembly 10. Specifically, the bowden wire 241 is connected at a first end 250 thereof to a linkage assembly 252 housed within a stamped metal housing 253 and including an arm 254 pivotally coupled to the actuator handle 240 at a first end 256, and pivotably coupled to a pivot member 258 at a second end 260. The pivot member 258 is pivotably coupled to the keyboard support tray about a pivot axis 262. A second end (not shown) of the bowden cable is coupled to the valve tab 131 of the pneumatic cylinder 120 such that pivoting of the actuator handle 240 actuates the valve of the pneumatic cylinder 120, thereby allowing the user to vertically adjust the support arm assembly 16 and the vertical position of the supported computer monitor 11 and computer keyboard 13.

Alternatively, the keyboard tray 210a (FIGS. 28-30) comprises a keyboard support surface 212a, a separate worksurface 214a and walls 216a that cooperate to form a pocket or compartment 232a, and comprise almost entirely molded plastic, without the use of an insertable metal housing 253, as discussed above. As the keyboard tray 210 and the keyboard tray 210a are similar in construction, the same corresponding reference numerals are used for both except the suffix "a" in the numerals of the latter. In the illustrated example, the keyboard support assembly 164 further includes an actuator handle 240 pivotably coupled to the keyboard support tray 210a. The handle 240a is coupled to the valve tab 131a via a bowden wire 241a, thereby allowing the operator to remotely actuate the pneumatic cylinder 120a and adjust the overall height of the workstation assembly 10a. Specifically, the bowden wire 241a is connected at a first end 250a thereof to a linkage assembly 252a housed within a stamped metal housing 253a and including an arm 254a pivotally coupled to the actuator handle 240a at a first end 256a, and pivotably coupled to a pivot member 258a at a second end 260a. The pivot member 258a is pivotably coupled to the keyboard support tray about a pivot axis 262a. A second end (not shown) of the bowden cable is coupled to the valve tab 131a of the pneumatic cylinder 120a such that pivoting of the actuator handle 240a actuates the valve of the pneumatic cylinder 120a, thereby allowing the user to vertically adjust the support arm assembly 16a and the vertical position of the supported computer monitor 11a and computer keyboard 13a. It is noted that the components and members of the linkage assembly 252a are mounted to and within the keyboard tray 210a without use of a separated mounting housing.

The workstation assembly 10 further includes a handle 242 (FIG. 1) having a base portion 244 mounted to the computer monitor 11 support assembly 162 and a pair of grips 246 extending vertically along the sides of the supported computer monitor 11. The grips also allow easy manipulation and adjustment of the computer monitor 11 without requiring direct grasping of the same.

The present inventive workstation support assembly provides improved maneuverability and adjustability that facilitates easy access and interaction with the associated computer equipment. The workstation support assembly also improves the ability to share information amongst healthcare professionals attending to a particular patient, as well as the patient themselves. The workstation support assembly further reduces the amount of floor space necessary for use, and is compact when in storage. Moreover, the present invention is uncomplicated in design, can be operated by even unskilled personnel, can be easily and quickly assembled, is efficient in use, and is particularly well adapted for the proposed use.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A workstation support assembly comprising:
a support assembly;
a post assembly rotationally supported by the support assembly and including a post member having a first end and a second end;
a computer monitor support assembly operably coupled for rotation with the first end of the post member by a pivot assembly; and
a keyboard support assembly operably coupled for rotation with the second end of the post member, the keyboard support assembly and the computer monitor support assembly being interconnected through the post assembly by the pivot assembly in a manner such that rotation of the keyboard support assembly also rotates the post member and the computer monitor support assembly, while rotation of the computer monitor support assembly does not rotate the computer keyboard support assembly.

2. The workstation support assembly of claim 1, wherein the computer monitor support assembly is frictionally coupled for rotation with the first end of the post member by the pivot assembly.

3. The workstation support assembly of claim 2, wherein the keyboard support assembly is fixed for rotation with the second end of the post member.

4. The workstation support assembly of claim 3, wherein the support assembly frictionally engages the post assembly with a first frictional force, the post assembly further includes a first collar fixed for rotation with the second end of the post member, and a second collar fixed for rotation with the computer monitor support assembly, the second collar frictionally engaging the first collar with a second frictional force, and wherein the first frictional force is greater than the second frictional force.

5. The workstation support assembly of claim 4, the computer monitor support assembly includes a tubularly shaped portion that receives at least a portion of the second collar therein.

6. The workstation support assembly of claim 5, wherein the second collar is press fit within the computer monitor support assembly.

7. The workstation support assembly of claim 4, wherein first collar is coupled to the second end of the post member by a mechanical fastener.

8. The workstation support assembly of claim 1, wherein the computer keyboard support assembly includes a keyboard support arm having an aperture extending therethrough that receives at least a portion of the post member therein.

9. The workstation support assembly of claim 1, wherein the monitor support assembly further includes a VESA computer monitor mount.

10. The workstation support assembly of claim 1, wherein the support assembly includes a vertically adjustable arm assembly.

11. The workstation support assembly of claim 10, wherein the arm assembly includes a four-bar linkage.

12. The workstation support assembly of claim 10, wherein the arm assembly is pivotably adjustable.

13. A workstation support assembly adapted to support a computer monitor and comprising:
a first elongate member;
a second elongate member;
a first end member pivotably coupled to the first and second elongate members by at least one first pivot member and pivotably supportable from a support assembly;
a second end member pivotably coupled to the first and second elongate members by at least one second pivot member, wherein the first elongate member, the second elongate member, the first end member and the second end member are coupled together by the at least one first pivot member and the at least one second pivot member to form a four-bar linkage and an interior passage; and
a cable management member extending through the interior passage and forming a trough to receive and guide wires within the interior passage.

14. The workstation support assembly of claim 13, wherein the cable management member is fixedly coupled to the first elongate member.

15. The workstation support assembly of claim 14, wherein the cable management member is coupled to the first elongate member via an adhesive.

16. The workstation support assembly of claim 13, wherein the cable management member comprises a C-shaped cross-sectional configuration.

17. The workstation support assembly of claim 13, wherein the cable management member includes a body portion, a cover portion and a snap couple coupling the body portion and the cover portion together.

18. A workstation assembly comprising:
a housing assembly comprising:
a rear wall having a width adapted to span a distance between vertically extending studs within a mounting wall; and
a cover member that cooperates with the rear wall to form an interior space of sufficient size to house a computer CPU therein;
a support assembly mounted to the housing assembly; and
a computer monitor support assembly coupled to the support assembly.

19. The workstation assembly of claim 18, wherein the width of the rear wall is equal to or greater than 16 inches.

20. The workstation assembly of claim 18, wherein the rear wall includes at least one recess extending into a front surface, and wherein a portion of the support assembly is nested within the at least one recess.

21. The workstation assembly of claim 20, wherein the at least one recess includes a first recess and a second recess, and wherein the portion of the support assembly is selectably nestable within either recess.

22. The workstation assembly of claim 21, wherein the cover member includes a top wall having a first notch and a second notch each adapted to receive a portion of the support assembly therein, and wherein the first notch and the second notch are aligned with the first recess and the second recess, respectively.

23. The workstation assembly of claim 18, wherein the support assembly comprises a vertically adjustable arm assembly.

24. The workstation assembly of claim 23, wherein the arm assembly is pivotably adjustable with respect to the housing assembly.

25. The workstation assembly of claim 18, wherein the housing assembly further includes first end wall and a second end wall that cooperate with the rear wall and the cover member to form the interior space.

26. The workstation assembly of claim 25, wherein the first and second end walls each include a plurality of air flow holes extending therethrough.

27. A keyboard support assembly comprising:
a support member;
a keyboard support tray coupled to the support member and movable between a lowered in-use position and a raised storage position with respect to the support member; and
a cam assembly comprising:
  a cam member connected to a select one of the support member and the keyboard support tray; and
  an engagement member connected to a select one of the support member and the keyboard support tray not connected to the cam member, the engagement member engaging the cam member to hold the keyboard support tray in the raised storage position.

28. The keyboard support assembly of claim 27, wherein the engagement member includes a leaf spring.

29. The keyboard support assembly of claim 27, wherein the keyboard support tray is pivotably couple to the support member.

30. The key board support assembly of claim 29, wherein the cam member is positioned about a pivot axis defined by the pivotable couple between the support member and the keyboard support tray.

31. The keyboard support assembly of claim 27, wherein the engagement member is connected to a bottom surface of the support member.

32. The keyboard support assembly of claim 27, wherein the keyboard support tray is substantially vertically oriented when in the raised storage position.

33. The keyboard support assembly of claim 27, wherein the support member frictionally engages the keyboard support tray.

34. A keyboard support assembly comprising:
a support member; and
a keyboard support tray coupled to the support member and movable between a lowered in-use position and a raised storage position with respect to the support member, the keyboard support tray including a keyboard support surface and a storage compartment having an interior space, the keyboard support surface including a computer input manipulation area, and wherein the storage compartment receives a computer input device within the interior space when the keyboard support tray is in the storage position.

35. The keyboard support assembly of claim 34, wherein the storage compartment is forwardly opening.

36. The keyboard support assembly of claim 35, wherein the storage compartment is defined by the keyboard support surface and a pair of side walls.

37. The keyboard support assembly of claim 36, wherein the storage compartment is further defined by a worksurface elevated above the keyboard support surface.

38. The keyboard support assembly of claim 36, wherein at least one of the sidewalls is forwardly tapered to guide a computer input device into the storage compartment.

39. The keyboard support structure of claim 34, wherein the keyboard support tray is pivotably coupled to the support member.

40. The keyboard support structure of claim 34, wherein the keyboard support tray is substantially vertically oriented when in the raised storage position.

41. A workstation support assembly adapted to support a computer monitor and comprising:
a computer monitor support member;
a first elongate member;
a second elongate member;
a first end member pivotably coupled to the first and second elongate members by a plurality of pivot members, and pivotably supportable from a support assembly;
a second end member pivotably coupled to the first and second elongate members, wherein the first elongate member, the second elongate member, the first end member and second end member are coupled together to form a four-bar linkage and an interior passage, the second end member coupled to the computer monitor support member;
a pneumatic cylinder having a first end pivotably coupled to the first end member and a second end pivotably coupled to the second end member, the pneumatic cylinder having a valve for actuating the pneumatic cylinder; and
an actuator remotely located from the pneumatic cylinder and coupled with the valve for actuating the valve, wherein the pneumatic cylinder is locked at a given length unless the actuator has actuated the valve of the pneumatic cylinder.

42. The workstation support assembly of claim 41, further including:
a keyboard support assembly supported by the second end member and adapted to support a computer keyboard thereon, and wherein the actuator is coupled to the keyboard support assembly.

43. The workstation support assembly of claim 42, wherein the actuator is coupled with the valve by a cable.

44. A support assembly, comprising:
a base;
a vertically adjustable support arm assembly mounted to the base;
a pivot assembly attached to the support arm assembly;
a computer monitor support attached to the pivot assembly for rotational movement about a substantially vertical axis;
a keyboard support attached to the pivot assembly for rotational movement about a substantially vertical axis; and
the pivot assembly configured such that a first frictional force is exerted between the pivot assembly and the keyboard support and a second frictional force that is less than the first frictional force is exerted between the pivot assembly and the computer monitor support such that rotation of the keyboard support rotates both the keyboard support and the computer monitor support, while rotation of the keyboard monitor support rotates the monitor support separate from the keyboard support.

45. The support assembly of claim 44, wherein the base includes a wall support assembly.

46. The support assembly of claim 44, wherein the computer monitor support is frictionally coupled for rotation with a first portion of the pivot assembly.

47. The support assembly of claim 46, wherein the keyboard support is fixed for rotation with a second portion of the pivot assembly.

48. The support assembly of claim 47, wherein the support arm assembly frictionally engages the pivot assembly with a first frictional force, the pivot assembly further includes a first collar fixed for rotation with the second portion of the pivot assembly, and a second collar fixed for rotation with the computer monitor support, the second collar frictionally engaging the first collar with a second frictional force, and wherein the first frictional force is greater than the second frictional force.

49. The support assembly of claim 48, the computer monitor support includes a tubularly shaped portion that receives at least a portion of the second collar therein.

50. The support assembly of claim 49, wherein the second collar is press fit within the computer monitor support.

51. The support assembly of claim 48, wherein first collar is coupled to the second portion of the pivot assembly by a mechanical fastener.

52. The support assembly of claim 44, wherein the computer keyboard support includes a keyboard support arm having an aperture extending therethrough that receives the pivot assembly therein.

53. The support assembly of claim 44, wherein the support arm assembly includes a four-bar linkage.

54. The support assembly of claim 44, wherein the support arm assembly is pivotably adjustable.

* * * * *

UNITED STATES PATENT AND TRADEMARK OFFICE
CERTIFICATE OF CORRECTION

| PATENT NO. | : 7,997,211 B2 |
|---|---|
| APPLICATION NO. | : 11/761581 |
| DATED | : August 16, 2011 |
| INVENTOR(S) | : Peterson et al. |

Figure 20:
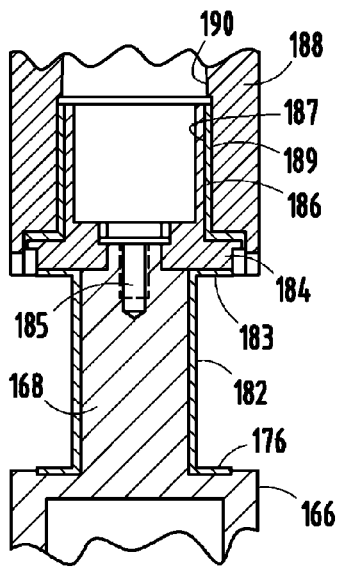
FIG. 20 is a cross-sectional view taken of the area XX, FIG. 19.
Figure 21:
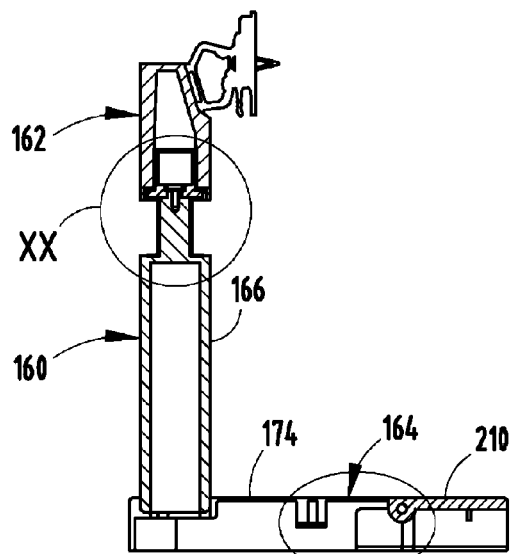
FIG. 21 is a cross-sectional view of the post assembly, the monitor and keyboard support assemblies.

It is certified that error appears in the above-identified patent and that said Letters Patent is hereby corrected as shown below:

In the Specifications:
Col. 4, line 8
Fig. 20 shows no "area XX"; however, Fig. 21 does show area XX. *

Col. 5, line 12
"standard with between" should be -- standard width between -- *

Col. 5, line 35
"are" should be -- is -- [subject-verb agreement] *

Col. 5, line 45
"are" should be -- is -- *

Col. 5, line 48
"are" should be -- is -- *

Col. 5, line 65
"standard with between" should be -- standard width between -- *

Col. 6, line 2
"extend" should be -- extends -- *

Col. 6, line 21
"are" should be -- is -- *

Col. 6, line 32
"are" should be -- is -- *

Signed and Sealed this
Eighteenth Day of October, 2011

David J. Kappos
*Director of the United States Patent and Trademark Office*

Col. 6, line 35
"are" should be -- is -- *

Col. 6, lines 52-53
"90 each include" should be -- 90 includes -- *

Col. 7, line 66
"16 fixedly" should be -- 16 is fixedly -- *

Col. 8, line 5
"upper most" should be -- uppermost -- *

Col. 8, line 8
"lower most" should be -- lowermost -- *

Col. 8, line 46
"is" should be -- are -- *

Col. 8, line 61
"therein" should be -- thereon -- *

Col. 8, line 66
"positions" should be -- persons -- *

Col. 9, line 10
"extend" should be -- extends -- *

Col. 10, line 42
"separated" should be -- separate -- *

In the claims:
Col. 11, claim 5, line 37
"claim 4, the" should be -- claim 4, wherein the -- [consistency] *

Col. 12, claim 25, line 62
"includes first" should be -- includes a first -- *

Col. 13, claim 29, line 18
"couple" should be -- coupled -- *

Col. 13, claim 30, line 20
"key board" should be -- keyboard -- *

Col. 15, claim 51, line 3
"wherein first" should be -- wherein the first -- *